United States Patent Office 2,880,141
Patented Mar. 31, 1959

2,880,141

CONVERSION OF EPOXY-KETONES INTO HYDROXY COMPOUNDS BY THE ACTION OF FERMENTING YEAST

Bruno Camerino and Alberto Vercellone, Milan, Italy, assignors to Società Farmaceutici Italia, a corporation of Italy No Drawing. Application January 31, 1956
Serial No. 562,614

Claims priority, application Italy February 3, 1955

6 Claims. (Cl. 195—51)

This invention relates to the conversion into hydroxy compounds of epoxy-ketones, particularly $\alpha,\beta$-epoxy-keto steroids of the pregnane and suprarenalin series by the action of fermenting yeast.

The fact that fermenting yeast may exert a reducing action upon certain compounds containing a keto group in their molecule by hydrogenating the keto group into a hydroxy group has been known in the past.

Now we have made the unexpected discovery that, upon subjecting compounds to the action of fermenting yeast which contain in their molecule a keto group as well as an epoxy bridge, the keto group is reduced to hydroxyl, the epoxy bridge is likewise changed into a hydroxy group, and the introduction of the new hydroxy group occurs, notwithstanding the reducing nature of the medium. Thus, the resulting product contains three alcohol groups, in place of the carbonyl and the epoxide bridge of the starting material. If the structural and steric conditions are favorable, a further change takes place in that one hydroxy group is eliminated in form of water. In this case, the final product of the fermentation action contains two hydroxy groups and a double bond in lieu of the carbonyl and epoxy bridge of the starting material. As will be seen from the herein following examples, the elimination of one of the three hydroxy groups resulting in a final product containing two hydroxy groups and a double bond takes place only in cases where the carbonyl group and the epoxy bridge are in immediate vicinity in the starting material, such as in a compound comprising the following structure

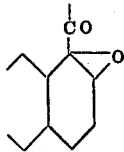

It is the particular object of the present invention to apply this conversion to $\alpha,\beta$-epoxy-keto steroids of the pregnane and suprarenalin series in order to obtain new compounds possessing different therapeutic properties.

This and other objects and advantages will be more evident from the herein following detailed description of the invention.

With respect to steroids, the afore-described action of fermenting yeast can be ascertained by the fact that, upon for example subjecting 4,5-epoxy-pregnane-3,20-dione to the action of fermenting yeast, a new compound, namely pregnane-3,4,5-triol-20-one, is obtained. Typical is a more complex compound which results upon treatment of 16,17-epoxide-progesterone with fermenting yeast; in this instance a ketone in the 20-position has been reduced for the first time by means of fermenting yeast.

The chemical configuration of the new compounds could be unequivocally established by comparison between the compound obtained upon treating 16,17-epoxy-$\Delta^5$-pregnane-3-$\beta$-ol-20-one with fermenting yeast and a compound obtained as a result of an equivalent chemical treatment of the starting material. The two compounds are identical in every respect, thus proving the correctness of the assigned structure.

When carried out by chemical means, such conversions require very drastic means and a strongly dehydrating medium. It is, therefore, the more surprising that, according to the herein claimed invention, identical changes can be attained in the aqueous medium of a yeast slurry. Of particular significance is the selectivity of the new reaction, which permits to obtain, in a single step, a compound having hydroxy groups in certain, well defined positions, while other desirable groups that may be part of the molecule are not impaired at all by the treatment. This is generally not possible when using chemical instead of the herein disclosed biochemical means.

These new derivatives are of particular value as intermediates in the preparation of compounds of the aldosterone (electrochortine) type of hormones, lately isolated from suprarenal glands, in that the double bond in the 13-position permits the introduction of an aldehyde group into the molecule at that location.

The following examples are furnished to illustrate the invention, without intent to limit its scope thereby in any manner.

*Example 1.—1,3-diphenylglycerol*

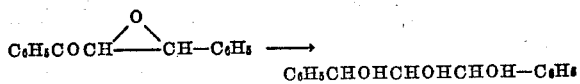

20 gr. of compressed yeast are dispersed in a sterilized solution of 40 gr. of ordinary sugar in 300 cc. of tap water and the dispersion is poured into an Erlenmeyer flask provided with a bubble cap. After keeping in a thermostat at 32° C. for 1 hour, a solution of 15 cc. ethanol, containing 0.5 gr. of benzalacetophenone epoxide, having a M.P. of 90° C., is added and the mixture is left to ferment at 32° C. After 40 hours of fermentation, additional 20 gr. of yeast, dispersed in a solution of 40 gr. sugar in 300 cc. of water, are added. This operation is repeated another 3 times, at intervals of 48 hours. After a total fermentation time of 10 days, the mixture is filtered, and the filtrate extracted with ethyl-acetate. After washing the ethyl-acetate extract with diluted acid and alkali solutions and with water, it is dried and evaporated. An oleous residue weighing 0.45 gr. is obtained. At the same time the yeast is dried at 80° C. and extracted in a Soxhlet with ethyl-acetate. The solvent solution is washed with acid, alkali and water. After drying and distilling off the solvent, 240 mg. of a material are obtained which does not crystallize.

The residue remaining after evaporating the solvent of the filtrate extraction is treated with ether. Little prisms are obtained having a M.P. of 127–128° C.

For $C_{15}H_{16}O_3$:
  Found—percent C, 73.49; percent H, 6.62
  Calc.—percent C, 73.75; percent H, 6.60

A mixture of this product with a standard sample of 1,3-diphenylglycerol having a M.P. of 128° C., shows no melting point depression. The absorption spectra in the infrared region are also identical.

The triacetate of this product, prepared in the usual manner, melts at 129–130° C. and is identical with 1,3-diphenyl-glycerol triacetate.

Example 2.—Pregnane-3,4,5-triol-20-one

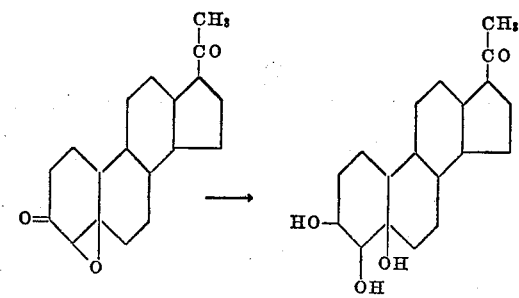

Example 1 is repeated, except that a solution of 15 cc. ethanol, containing 0.5 gr. 4,5-epoxy-pregnane-3,20-dione, having a M.P. of 133–135° C., is added to the fermenting yeast. After 10 days of fermentation, the extraction is carried out with ethyl acetate in the afore-described manner. From the filtered liquid and from the yeast, a total amount of 200 mg. of pregnane-3,4,5-triol-20-one (M.P. 233–239° C.) is recovered.

Example 3.—17β-methyl-18-nor-Δ$^{4,13}$-17α-pregnadiene-16α-20-diol-3-one

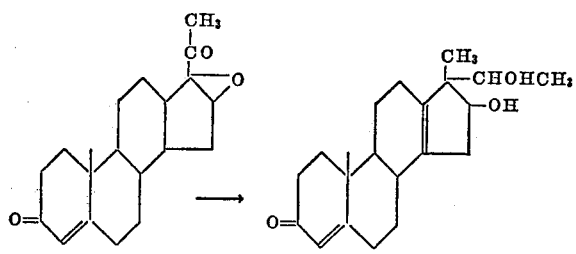

Example 1 is repeated, except that a solution of 15 cc. ethanol containing 0.5 gr. 16,17-epoxy-progesterone, having a M.P. of 204–206° C., is added to the fermenting yeast. After 10 days of fermentation, the extraction is carried out with ethyl acetate in the usual manner. From the yeast, about 0.1 gr. of the starting material is recovered. From the filtered liquid, 300 mg. of a crude product are obtained that yields, upon recrystallization from methanol, 170 mg. of 17β-methyl-18-nor-Δ$^{4,13}$-17α-pregnadiene-16α-20-diol-3-one, having a M.P. of 172–175° C.; $(\alpha)_D^{26}$=—15°∓4° (c.=1.14 in chloroform), λ max 240 mμ, ε=16,700 (in ethanol).

For $C_{21}H_{30}O_3$:
  Found—percent C, 76.28; percent H, 9.43
  Calc.—percent C, 76.32; percent H, 9.15

0.1 gr. of this new substance is treated for 16 hours at room temperature with 0.5 cc. of pyridine and 0.2 cc. of acetic anhydride. After the addition of ice, the precipitate is filtered off and, after drying, recrystallized from ether. Hexagonal crystals of 17β-methyl-18-nor-Δ$^{4,13}$-17α-pregnadiene-16α-20-diol-3-one-diacetate are obtained, having a M.P. of 132–134° C.; $(\alpha)_D^{20}$=—21°∓4° (in chloroform), λ max 240 mμ, ε=17,400 (in ethanol).

For $C_{25}H_{34}O_5$:
  Found—percent C, 72.45; percent H, 8.36
  Calc.—percent C, 72.43; percent H, 8.27

Example 4.—17β-methyl-18-nor-Δ$^{5,13}$-17α-pregnadiene-3β,16α-20-triol

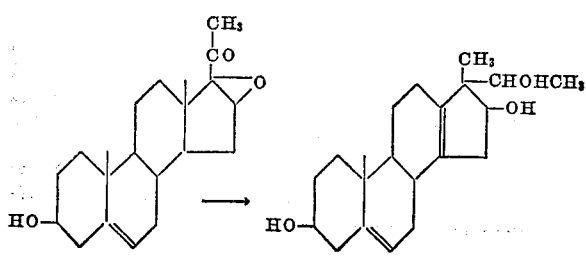

Example 1 is repeated, except that a solution of 15 cc. ethanol containing 0.5 gr. of 16,17-oxide-Δ$^5$-pregnane-3β-ol-20-one, having a M.P. of 189–190° C., is added to the fermenting yeast. After 10 days of fermentation, the extraction is carried out with ethyl acetate in the usual manner. From the yeast, about 0.3 gr. of the starting material is recovered. From the filtered liquid, about 100 mg. of a product are obtained that, upon recrystallization from methanol-acetone, yields small bright prisms, having a M.P. of 202–204° C.

$(\alpha)_D^{25}$=+189°∓4° (in ethanol)

For $C_{21}H_{32}O_3$:
  Found—percent C, 75.80; percent H, 9.76
  Calc.—percent C, 75.86; percent H, 9.70

0.25 gr. of the compound are acetylated at room temperature with pyridine and acetate anhydride. Upon recrystallization from petroleum ether, 270 mg. of 17β-methyl - 18 - nor - Δ$^{5,13}$ - 17α - pregnadiene - 3β,16α - 20-triol triacetate are obtained, having a M.P. of 124–126° C., $(\alpha)_D^{25}$=—157°∓4° (in chloroform).

Found: percent C, 70.64; percent H, 8.42
Calc.: percent C, 70.71; percent H, 8.35

Example 5.—17β-methyl-18-nor-Δ$^{13}$-17α-pregnane-16α,20-diol-3-one

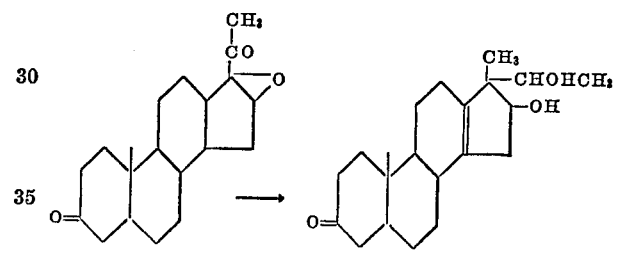

Example 1 is repeated, except that a solution of 15 cc. ethanol containing 0.5 gr. of 16,17-epoxide-pregnane-3,20-dione, having a M.P. of 170–172 C., is added to the fermenting yeast. From the filtered liquid, about 100 mg. of 17β-methyl-18-nor-Δ$^{13}$-17α-pregnane-16α,20-diol-3-one are obtained, having a M.P. of 223–225° C.

Example 6.—17β - methyl - 18 - nor - Δ$^{5,13}$ - 17α - pregnadiene - 3β,16α - 20,21 - tetrol - 21 acetate

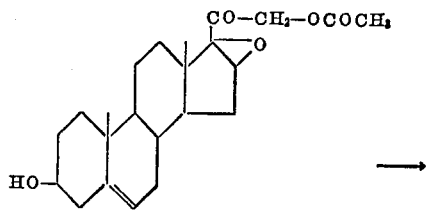

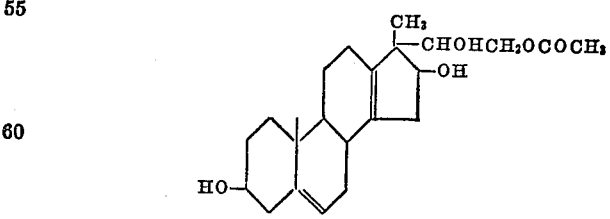

Example 1 is repeated, except that a solution of 20 cc. ethanol containing 0.5 gr. of 16,17-epoxide-Δ$^5$-pregnane-3β,21-diol-20-one-21 acetate, having a M.P. of 185–190° C., is added to the fermenting yeast. From the filtered liquid, 200 mg. of 17β-methyl-18-nor-Δ$^{5,13}$-17α-pregnadiene-3β,16α-20,21-tetrol-21 acetate having a M.P. of 205–210° C., are obtained.

We claim:
1. The method of converting the epoxy bridge of an epoxy-ketone into hydroxyl, which comprises subjecting the solution of said epoxy-ketone to the action of fermenting yeast.

2. The method of converting the epoxy bridge of an epoxy-ketone into two hydroxy groups, which comprises subjecting the solution of said epoxy-ketone to the action of fermenting yeast.

3. The method of converting an epoxy-ketone into the respective trihydroxy derivative, which comprises subjecting a solution of said epoxy-ketone to the action of fermenting yeast.

4. The method according to claim 3, wherein the conversion is continued until one of the hydroxy groups is eliminated in form of water.

5. The method according to claim 3, wherein the conversion is continued until the carbonyl and the epoxy bridge of the starting material are changed into two hydroxy groups and a double bond.

6. The method of converting the carbonyl group and the epoxy bridge of the $\alpha,\beta$-epoxy-ketone of a steroid of the pregnane and suprarenalin series into hydroxyl, which comprises subjecting the $\alpha,\beta$-epoxy-ketone of said steroid to the action of fermenting yeast.

References Cited in the file of this patent
UNITED STATES PATENTS

| | | |
|---|---|---|
| 2,267,258 | Ruzicher | Dec. 23, 1941 |
| 2,291,643 | Marker | Aug. 4, 1942 |
| 2,530,817 | Ehrenstein | Nov. 21, 1950 |
| 2,649,402 | Murray | Aug. 18, 1953 |
| 2,658,023 | Shull | Nov. 3, 1953 |
| 2,753,290 | Fried | July 3, 1956 |